United States Patent
Kurashima et al.

(10) Patent No.: US 8,577,010 B2
(45) Date of Patent: Nov. 5, 2013

(54) TELEPHONE RELAY DEVICE, METHOD OF RELAYING TELEPHONES, AND PROGRAM THEREFOR

(75) Inventors: Akihisa Kurashima, Tokyo (JP); Toru Kaji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/499,180

(22) PCT Filed: Aug. 31, 2010

(86) PCT No.: PCT/JP2010/005354
§ 371 (c)(1),
(2), (4) Date: Mar. 29, 2012

(87) PCT Pub. No.: WO2011/039939
PCT Pub. Date: Apr. 7, 2011

(65) Prior Publication Data
US 2012/0189114 A1   Jul. 26, 2012

(30) Foreign Application Priority Data
Sep. 30, 2009   (JP) ................................. 2009-228393

(51) Int. Cl.
*H04M 3/54* (2006.01)
*H04M 3/58* (2006.01)

(52) U.S. Cl.
USPC ................. 379/211.02; 379/212.01

(58) Field of Classification Search
USPC ....................... 379/211.02, 212.01
See application file for complete search history.

(56) References Cited

U.S. PATENT DOCUMENTS

2008/0181388 A1   7/2008   Nakai
2009/0052651 A1*  2/2009   Iwakawa et al. ......... 379/212.01

FOREIGN PATENT DOCUMENTS

| JP | 60-033773 A | 2/1985 |
| JP | 07-074832 A | 3/1995 |
| JP | 2002-101435 A | 4/2002 |
| JP | 2008-085901 A | 4/2008 |

* cited by examiner

*Primary Examiner* — Harry Hong
(74) *Attorney, Agent, or Firm* — Sughrue Mion, PLLC

(57) ABSTRACT

A second device (120) has a first virtual terminal and a second virtual terminal. The second device (120) switches the access point of a third telephone terminal (32) to the first virtual terminal and switches the access point of a second telephone terminal (22) to the second virtual terminal by control of a first device (110). Then, the first virtual terminal is put on hold. Then, the first virtual terminal calls the first telephone terminal by an outgoing call for forwarding to a first telephone terminal (12). Then, the first device (110) connects the first telephone terminal (12) to the third telephone terminal (32).

9 Claims, 21 Drawing Sheets

TELEPHONE RELAY DEVICE, METHOD OF RELAYING TELEPHONES, AND PROGRAM THEREFOR

CROSS REFERENCE TO RELATED APPLICATION

This application is a National Stage of International Application No. PCT/JP2010/005354, filed on Aug. 31, 2010, claiming priority based on Japanese Patent Application No. 2009-228393, filed Sep. 30, 2009, the contents of all of which are incorporated herein by reference in their entirety.

TECHNICAL FIELD

The present invention relates to a telephone relay device, a method of relaying telephones, and a program for forwarding a telephone call between the second telephone terminal and a third telephone terminal to a first telephone terminal.

BACKGROUND ART

A telephone call between the second telephone terminal and the third telephone terminal is sometimes forwarded to the first telephone terminal. For example, when the first telephone terminal and the second telephone terminal belong to the same internal line communication network, the first telephone terminal and the second telephone terminal are managed by the same telephone relay device. It facilitates forwarding from the second telephone terminal to the first telephone terminal.

In some cases, the telephone call is forwarded from the second telephone terminal to the first telephone terminal, even when the first telephone terminal and the second telephone terminal are managed by different telephone relay devices. For example, Patent Documents 1 and 2 describe that a signal line separate from a telephone call channel is provided between the telephone relay device for managing the first telephone terminal and the telephone relay device for managing the second telephone terminal. They also disclose that information (for example, access point information) necessary for forwarding is forwarded through the signal line.

RELATED DOCUMENT

Patent Document

[Patent Document 1] Japanese Unexamined Patent Application Publication No. 07-74832
[Patent Document 2] Japanese Unexamined Patent Application Publication No. 60-33773

DISCLOSURE OF THE INVENTION

The methods disclosed in Patent Documents 1 and 2, however, would require change of both configurations of the telephone relay device for managing the first telephone terminal and the telephone relay device for managing the second telephone terminal. For example, when it is difficult to disclose the specification of the telephone relay device for managing the second telephone terminal because of the preservation of confidentiality, it is practically difficult to change the telephone relay device for managing the second telephone terminal. Accordingly, it is desirable that the telephone call between the second telephone terminal and the third telephone terminal be forwarded to the first telephone call without change of the telephone relay device for managing the second telephone terminal.

It is an object of the present invention to provide a telephone relay device, a method of relaying telephones, and a program capable of forwarding a telephone call between the second telephone terminal and the third telephone terminal to the first telephone terminal without change of the telephone relay device for managing the second telephone terminal.

According to the present invention, there is provided a telephone relay device provided in a first telephone communication network and relaying a telephone call on a first telephone terminal connected to the first telephone communication network, the telephone relay device being used in conjunction with an external telephone relay device, the external telephone relay device being provided in a second telephone communication network and relaying a telephone call on a second telephone terminal connected to the second telephone communication network, the telephone relay device comprising:

a first virtual terminal;
a second virtual terminal;
a telephone exchange unit relaying a telephone call between the second telephone terminal and a third telephone terminal through the external telephone relay device, the third telephone terminal being outside the first telephone communication network and the second telephone communication network;
a forwarding order reception unit receiving first forwarding order information, the first forwarding order information being ordering forwarding of the telephone call between the second telephone terminal and the third telephone terminal from the second telephone terminal to the first telephone terminal;
a switching unit switching an access point of the third telephone terminal to the first virtual terminal and switching an access point of the second telephone terminal to the second virtual terminal by control of the telephone exchange unit, when the forwarding order reception unit receives the first forwarding order information;
a calling unit putting the first virtual terminal on hold after the first virtual terminal connects to the third telephone terminal, and then calling the first telephone terminal by forwarding outgoing from the first virtual terminal to the first telephone terminal; and
a connection processing unit connecting the first telephone terminal to the second telephone terminal through the first telephone terminal and the second virtual terminal after response of the first telephone terminal, and then connecting the first telephone terminal to the third telephone terminal when receiving second forwarding order information, the second forwarding order information being ordering switch of the access point of the first telephone terminal from the second telephone terminal to the third telephone terminal.

According to the present invention, there is provided a method of relaying telephones,
wherein a first virtual terminal and a second virtual terminal are provided in a telephone relay device, the telephone relay device being provided in a first telephone communication network and relaying a telephone call on a first telephone terminal connected to the first telephone communication network,
wherein the telephone relay device
relays a telephone call between a second telephone terminal and a third telephone terminal through an external telephone relay device, the second telephone terminal being connecting to a second telephone communication network, the third telephone terminal being outside the first telephone communication network and the second telephone communication network, and the external telephone relay device being provided in the second telephone communication network, receives first forwarding order information, the first forwarding order information being ordering forwarding of the telephone call between the second telephone terminal and the third telephone terminal from the second telephone terminal to the first telephone terminal, switches an access point of the third telephone terminal to the first virtual terminal and switches an access point of the second telephone terminal to the second virtual terminal, when the first forwarding order information is received, puts the first virtual terminal on hold after connecting the first virtual terminal to the third telephone terminal, and then calls the first telephone terminal by forwarding outgoing from the first virtual terminal to the first telephone terminal, and connects the first telephone terminal to the second telephone terminal through the first telephone terminal and the second virtual terminal after response of the first telephone terminal, and then connects the first telephone terminal to the third telephone terminal when receiving second forwarding order information, the second forwarding order information being ordering of switch of the access point of the first telephone terminal from the second telephone terminal to the third telephone terminal.

According to the present invention, there is provided a program for causing a computer to function as a telephone relay device relaying a telephone call on a first telephone terminal connected to a first telephone communication network, the program for causing the computer to execute functions of:

building a first virtual terminal;

building a second virtual terminal;

relaying a telephone call between a second telephone terminal and a third telephone terminal through an external telephone relay device, the second telephone terminal being connecting to a second telephone communication network, the third telephone terminal being outside the first telephone communication network and the second telephone communication network, and the external telephone relay device being provided in the second telephone communication network;

receiving first forwarding order information, the first forwarding order information ordering forwarding of the telephone call between the second telephone terminal and the third telephone terminal from the second telephone terminal to the first telephone terminal;

switching an access point of the third telephone terminal to the first virtual terminal and switching an access point of the second telephone terminal to the second virtual terminal, when the first forwarding order information is received;

putting the first virtual terminal on hold after connecting the first virtual terminal to the third telephone terminal, and then calling the first telephone terminal by forwarding outgoing from the first virtual terminal to the first telephone terminal; and connecting the first telephone terminal to the second telephone terminal through the first telephone terminal and the second virtual terminal after response of the first telephone terminal, and then connecting the first telephone terminal to the third telephone terminal when receiving second forwarding order information, the second forwarding order information being ordering switch of the access point of the first telephone terminal from the second telephone terminal to the third telephone terminal.

According to the present invention, the telephone call between the second telephone terminal and the third telephone terminal can be forwarded to the first telephone terminal without change of the telephone relay device for managing the second telephone terminal.

BRIEF DESCRIPTION OF THE DRAWINGS

The above-mentioned object, other objects, features, and advantages will be further described in the following preferred embodiments and with reference to the accompanying drawings.

DESCRIPTION OF EMBODIMENTS

Figure 1:
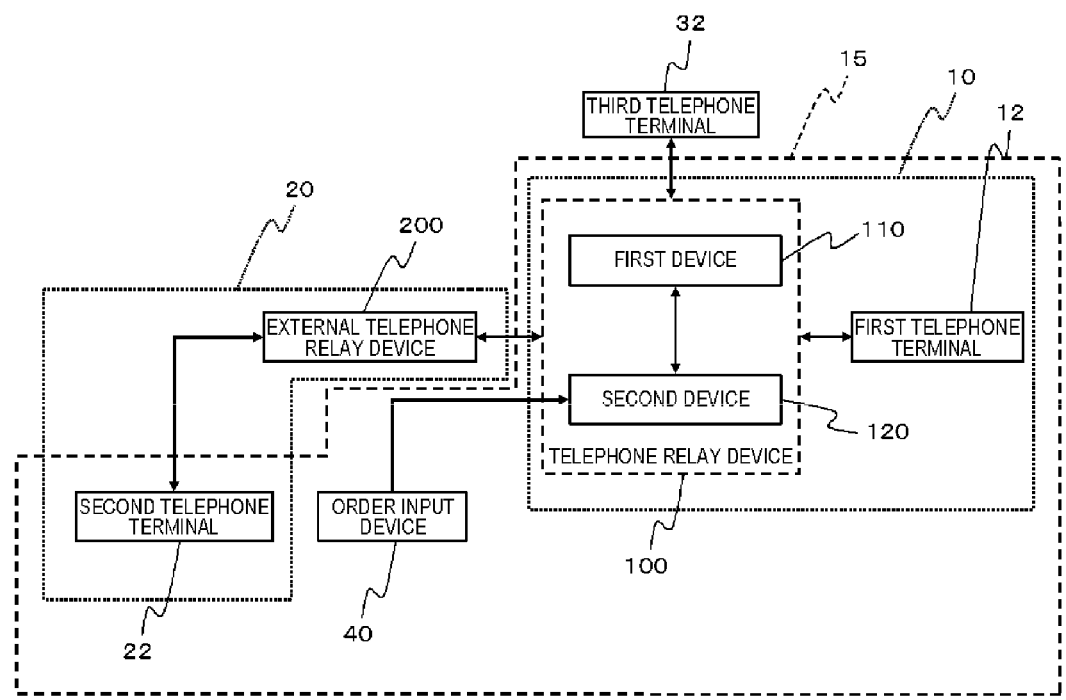
FIG. 1 is a block diagram illustrating a configuration of a telephone call system according to a first embodiment.

Hereinafter, embodiments of the present invention will be described with reference to drawings. In addition, in all the drawings, the common components will be represented by the same reference numerals and signs, and description thereof will not be repeated.

First Embodiment

FIG. 1 is a block diagram illustrating a configuration of a telephone call system according to a first embodiment. The telephone call system has a telephone relay device 100. The telephone relay device 100 is provided in a first telephone communication network 10 and relays a telephone call on a first telephone terminal 12 connected to the first telephone communication network 10. The telephone relay device 100 connects the first telephone terminal 12 to a second telephone terminal 22 connected to a second telephone communication network 20 through for example an external telephone relay device 200 of the second telephone communication network 20. Further, the telephone relay device 100 connects the first telephone terminal 12 to a third telephone terminal 32. The third telephone terminal 32 is outside the first telephone communication network 10 and the second telephone communication network 20. The first telephone communication network 10 is, for example, a fixed communication network such as an internal line communication network built inside an active base 15. The second telephone communication network 20 is, for example, a mobile communication network. The second telephone terminal 22 is, for example, a mobile telephone terminal, but may be used as an internal line terminal in the active base 15.

In such a system, when the outgoing call whose called party number corresponds to the second telephone terminal 22 is sent from the third telephone terminal 32 to the telephone relay device 100, the telephone relay device 100 connects the second telephone terminal 22 and the third telephone terminal 32 through the external telephone relay device 200. Then, a user of the second telephone terminal 22 transmits, as necessary, first forwarding order information to the telephone relay device 100. The first forwarding order information indicates ordering forwarding of the telephone call between the second telephone terminal 22 and the third telephone terminal 32 to the first telephone terminal 12. The first forwarding order information is forwarded from an order input device 40 to the telephone relay device 100. The order input device 40 is used by the user of the second telephone terminal 22, for example. The order input device 40 is disposed in the active base 15, and is, for example, a computer terminal, but may be the second telephone terminal 22 itself. Then, the telephone relay device 100 performs processing for forwarding the telephone call between the second telephone terminal 22 and the third telephone terminal 32 to the first telephone terminal 12.

In the telephone call system, the telephone relay device 100 is configured to include a first device 110 and a second device 120. The first device 110 has, for example, a configuration the same as that of a normal private branch exchange equipment. The second device 120 has a function necessary for the second telephone terminal 22 to forward the telephone call between the second telephone terminal 22 and the third telephone terminal 32 to the first telephone terminal 12. The second device 120 is a device added to the first device 110 as a supplement. Note that, in each embodiment to be described later, functions of the second device 120 may be included in the first device 110. In this case, the telephone relay device 100 is formed as a single device.

Figure 2:
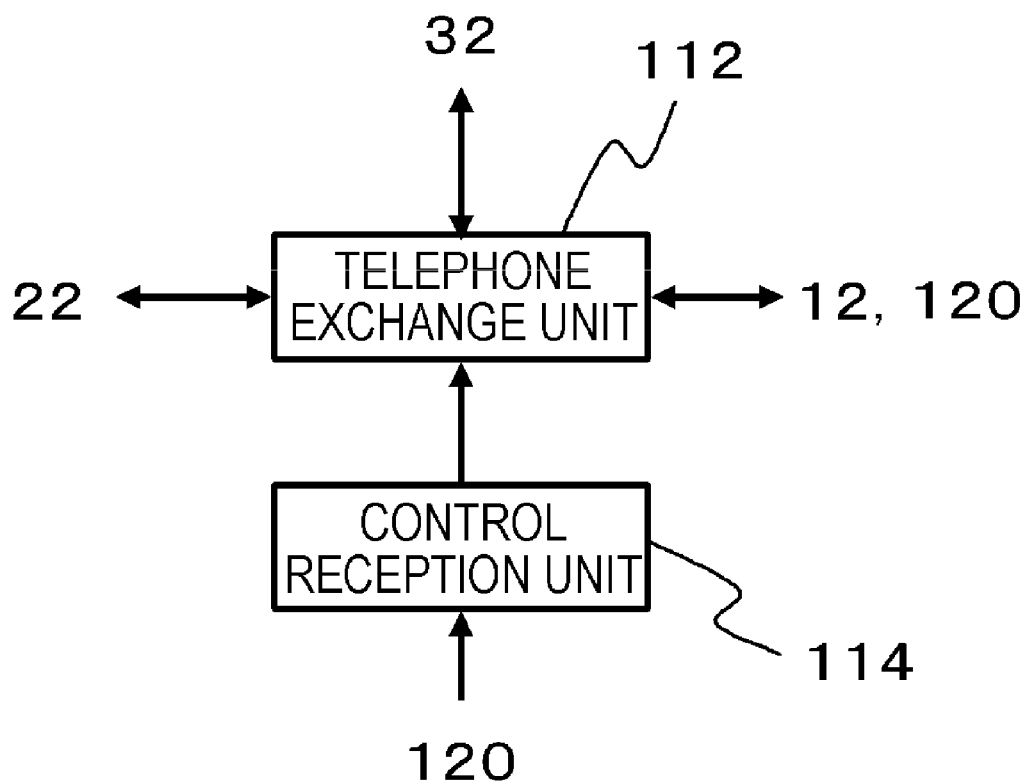
FIG. 2 is a block diagram illustrating a function configuration of a first device.

FIG. 2 is a block diagram illustrating a function configuration of the first device 110. The first device 110 has a telephone exchange unit 112 and a control reception unit 114. The telephone exchange unit 112 relays a telephone call between the third telephone terminal 32 and the second telephone terminal 22 through the external telephone relay device 200. Further, the telephone exchange unit 112 relays a telephone call between the first telephone terminal 12 and the third telephone terminal 32. The control reception unit 114 receives control information sent from the second device 120, and outputs the information to the telephone exchange unit 112. The telephone exchange unit 112 performs processing of exchanging telephones on the basis of the control information received by the control reception unit 114. The processing performed herein includes processing of forwarding the telephone call between the second telephone terminal 22 and the third telephone terminal 32 to the first telephone terminal 12.

Figure 3:
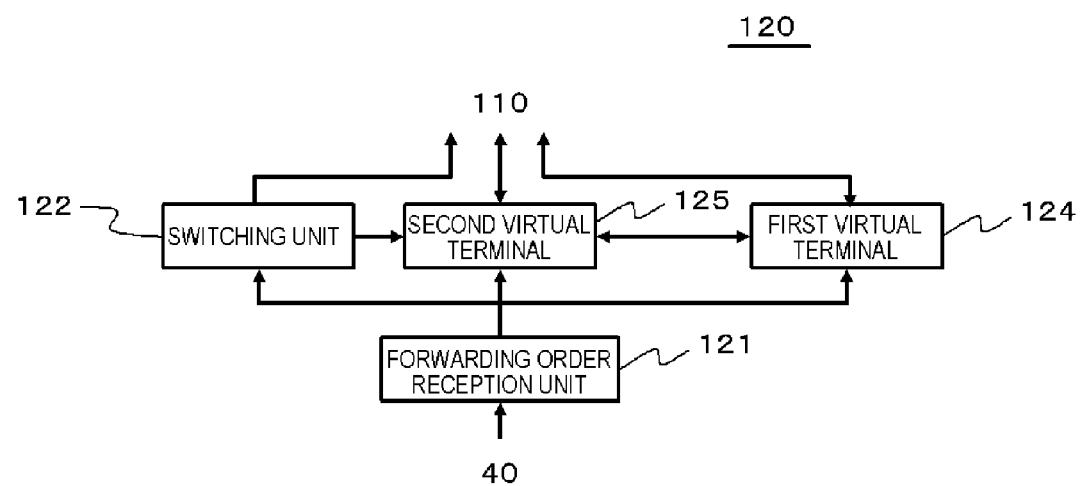
FIG. 3 is a block diagram illustrating a function configuration of a second device.

FIG. 3 is a block diagram illustrating a function configuration of the second device 120. The second device 120 includes a forwarding order reception unit 121, a switching unit 122, a first virtual terminal 124, and a second virtual terminal 125. The switching unit 122, the first virtual terminal 124, and the second virtual terminal 125 are connected to the first device 110. The forwarding order reception unit 121 receives first forwarding order information from the outside (for example, the order input device 40 shown in FIG. 1). The first forwarding order information is ordering forwarding of the telephone call between the second telephone terminal 22 and the third telephone terminal 32 from the second telephone terminal 22 to the first telephone terminal 12. When the forwarding order reception unit 121 receives the first forwarding order information, the switching unit 122 switches the access point of the third telephone terminal 32 to the first virtual terminal 124 and switches the access point of the second telephone terminal 22 to the second virtual terminal 125 by control of the telephone exchange unit 112. The forwarding order reception unit 121 may function as a calling unit and a connection processing unit. That is, the forwarding order reception unit 121, after connecting the first virtual terminal 124 to the third telephone terminal 32, puts the first virtual terminal 124 on hold. After that, the forwarding order reception unit 121 calls the first telephone terminal 12 by forwarding outgoing from the first virtual terminal 124 to the first telephone terminal 12. Then, after response of the first telephone terminal 12, the forwarding order reception unit 121 connects the first telephone terminal 12 to the second telephone terminal 22 through the first virtual terminal 124 and the second virtual terminal 125. Then, the forwarding order reception unit 121 connects the first telephone terminal 12 to the third telephone terminal 32 when receiving second forwarding order information. The second forwarding order information is ordering switch of the access point of the first telephone terminal 12 from the second telephone terminal 22 into the third telephone terminal 32. Furthermore, in the drawing, each of the first virtual terminal 124 and the second virtual terminal 125 is illustrated as a single unit, but may be provided as a plurality of units.

Further, in FIGS. 2 and 3, components irrespective of the bottom line of the present invention will not be repeated. The respective components of the first device 110 shown in FIG. 2 and the respective components of the second device 120 shown in FIG. 3 are not components based on hardware units, but are blocks based on function units. The components of the first device 110 and the components of the components of the second device 120 are implemented by a CPU and a memory of an arbitrary computer, programs loaded in the memory and implementing the components of the drawings, a storage unit such as a hard disk storing the programs, and arbitrary combination between software and hardware centered on an interface for network connection. In addition, those skilled in the art could understand various modified examples of the implementation method and device.

Figure 4:
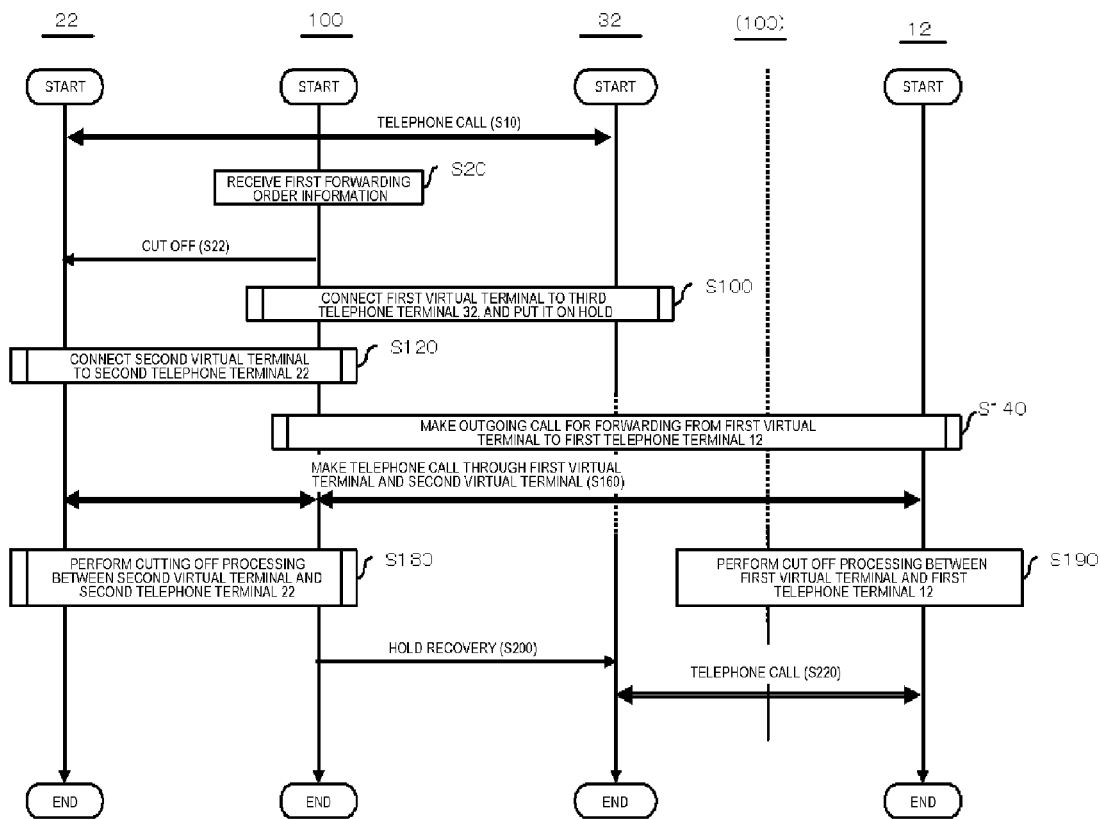
FIG. 4 is a flowchart illustrating a first example of forwarding processing of a telephone relay device shown in FIG. 1.

FIG. 4 is a flowchart illustrating a first example of the forwarding processing of the telephone relay device 100 shown in FIG. 1. First, the outgoing call is sent from the third telephone terminal 32 to the telephone exchange unit 112 of the telephone relay device 100. The outgoing call is set such that the telephone number of the third telephone terminal 32 is a calling party number and the telephone number of the second telephone terminal 22 is a called party number. Then, the telephone exchange unit 112 connects the second telephone terminal 22 and the third telephone terminal 32 through the external telephone relay device 200. Thus, a telephone call takes place (step S10). At this time, the telephone exchange unit 112 manages the calling party number (in this example, the telephone number of the third telephone terminal 32) and the called party number (in this example, the telephone number of the second telephone terminal 22) as related information of the telephone call.

When a user of the second telephone terminal 22 determines to forward the telephone call to the first telephone terminal 12, the user inputs order to transmit the first forwarding order information to the order input device 40. Then, the order input device 40 transmits the first forwarding order information to the telephone relay device 100. The first forwarding order information includes the telephone number of the second telephone terminal 22 and the telephone number of the first telephone terminal 12. The forwarding order reception unit 121 of the telephone relay device 100 receives the first forwarding order information sent from the order input device 40 (step S20).

The forwarding order reception unit 121 outputs the telephone number of the second telephone terminal 22 to the switching unit 122. The telephone number of the second telephone terminal 22 is included in the first forwarding order information. The switching unit 122 transmits the telephone number of the second telephone terminal 22 to the telephone exchange unit 112. The switching unit 122 also cuts off the telephone call on the second telephone terminal 22 (step S22) by control of the telephone exchange unit 112.

Subsequently, the switching unit 122 controls the telephone exchange unit 112, connects the first virtual terminal 124 to the third telephone terminal 32, and then puts the terminal on hold (step S100). The switching unit 122 may associate a plurality of the telephone numbers of the second telephone terminals 22 with the respective mutually different first virtual terminals 124. Each first virtual terminal 124 corresponding to the telephone number of each second telephone terminal 22 included in the first forwarding order information may be connected to the third telephone terminal 32. In this case, the telephone number of the first virtual terminal 124 may be set to be the same as the telephone number of the second telephone terminal 22. Subsequently, the switching unit 122 connects the second virtual terminal 125 to the second telephone terminal 22 (step S120). Then, the forwarding order reception unit 121 transmits the telephone number of the first telephone terminal 12 to the first virtual terminal 124, and calls the first telephone terminal 12 (step S140) by forwarding outgoing to the first telephone terminal 12. As described above, when the telephone numbers of the second telephone terminals 22 are associated with the mutually different first virtual terminals 124, the user of the first telephone terminal 12 is able to recognize the user of each second telephone terminal 22 as a forwarding source through the telephone number of each first virtual terminal 124 displayed on the first telephone terminal 12. Further, when the telephone number of the first virtual terminal 124 is the same as the telephone number of the second telephone terminal 22, the user of the first telephone terminal 12 is able to more surely recognize the user of the second telephone terminal 22 as the forwarding source. Further, even when the user fails to respond to the calling in step S140, the user can make the outgoing call to the second telephone terminal 22 by using the first telephone terminal 12.

The second telephone terminal 22 responds to the outgoing call from the second virtual terminal 125. The first telephone terminal 12 responds to the outgoing call for forwarding. Then, the second virtual terminal 125 connects the second telephone terminal 22 and the first telephone terminal 12 through the second virtual terminal 125 and the first virtual terminal 124. Thus, a telephone call takes place between the first telephone terminal 12 and the second telephone terminal 22 (step S160).

The forwarding order reception unit 121 receives second forwarding order information. The second forwarding order information is ordering switch of the access point of the first telephone terminal 12 from the second telephone terminal 22 to the third telephone terminal 32. On receiving the second forwarding order information, the forwarding order reception unit 121 makes the telephone exchange unit 112 perform processing of cutting off the telephone call between the second telephone terminal 22 and the second virtual terminal 125 through the switching unit 122 (step S180). At the same time, the forwarding order reception unit 121 makes the telephone exchange unit 112 perform processing of cutting off the telephone call between the first virtual terminal 124 and the first telephone terminal 12 through the switching unit 122 (step S190). Then, the forwarding order reception unit 121 makes the telephone exchange unit 112 notify the third telephone terminal 32 (step S200) of the recovery from on-hold status through the switching unit 122. At the same time, the first telephone terminal 12, of which the telephone call with the first virtual terminal 124 is cut off, connects to the third telephone terminal 32. Thus, a telephone call takes place between the first telephone terminal 12 and the third telephone terminal 32 (step S220).

Figure 5:
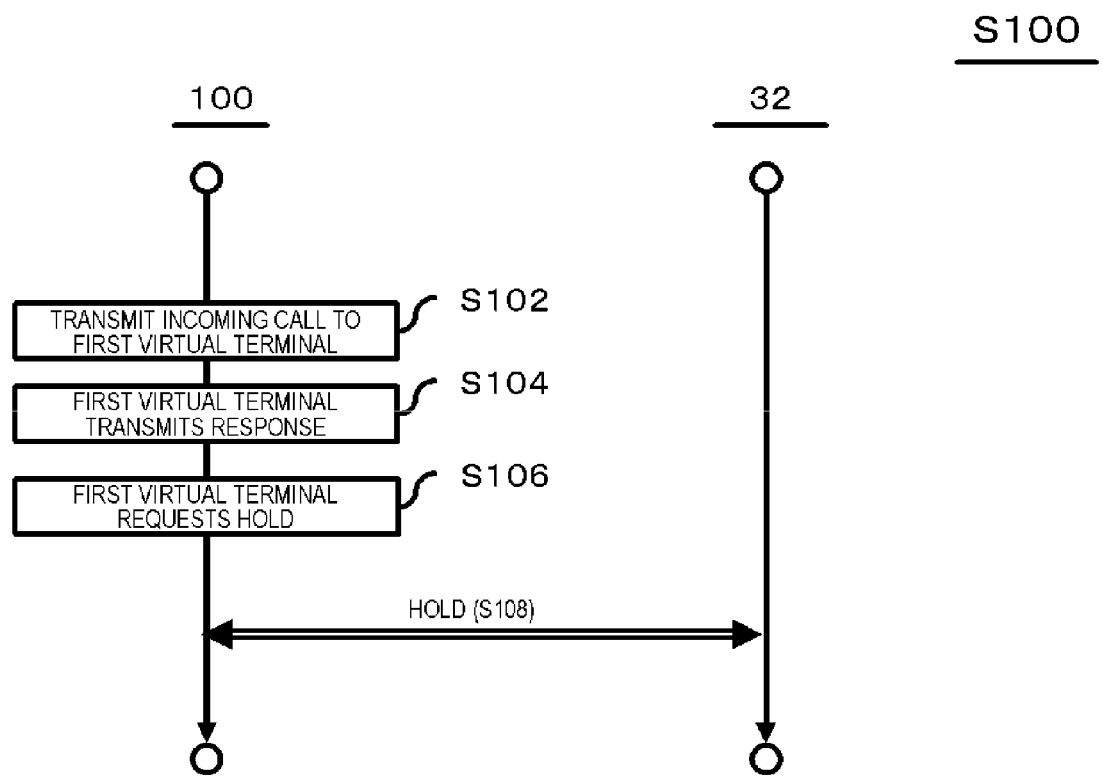
FIG. 5 is a flowchart illustrating details of step S100 of FIG. 4.

FIG. 5 is a flowchart illustrating details of step S100 of FIG. 4, that is, processing for connecting the first virtual terminal 124 to the third telephone terminal 32. As described above, when the telephone numbers of the second telephone terminals 22 are associated with mutually different respective first virtual terminals 124, the switching unit 122 of the second device 120 performs processing of the outgoing call to each first virtual terminal 124 corresponding to the telephone number of each second telephone terminal 22 on the telephone exchange unit 112. The telephone exchange unit 112 transmits the presence of an incoming call to the first virtual terminal 124 (step S102). The first virtual terminal 124 transmits an incoming call response indicating response to the incoming call (step S104). Subsequently, the first virtual terminal 124 transmits a hold request to put the telephone call on hold (step S106). On receiving the hold request, the telephone exchange unit 112 holds the telephone call between the first virtual terminal 124 and the third telephone terminal 32 (step S108).

Figure 6:
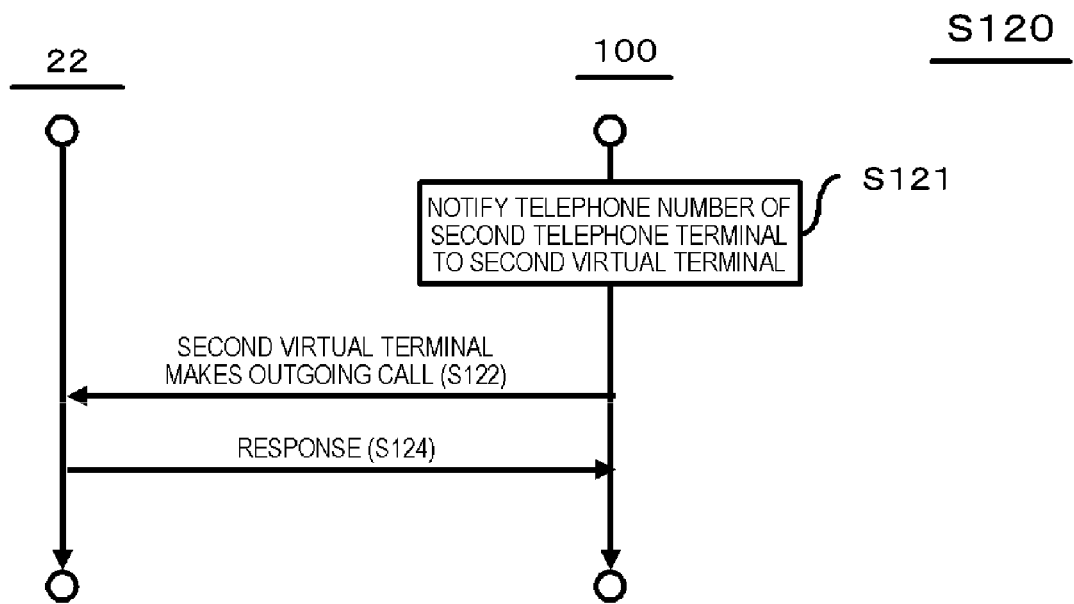
FIG. 6 is a flowchart illustrating details of step S120 of FIG. 4.

FIG. 6 is a flowchart illustrating details of step S120 of FIG. 4, that is, processing for connecting the second virtual terminal 125 to the second telephone terminal 22. First, the switching unit 122 notifies the second virtual terminal 125 (step S121) of the telephone number of the second telephone terminal 22. Then, the second virtual terminal 125 makes the outgoing call to the second telephone terminal 22 (step S122).

On response of the second telephone terminal 22 (step S124), the second virtual terminal 125 is connected to the second telephone terminal 22.

Figure 7:
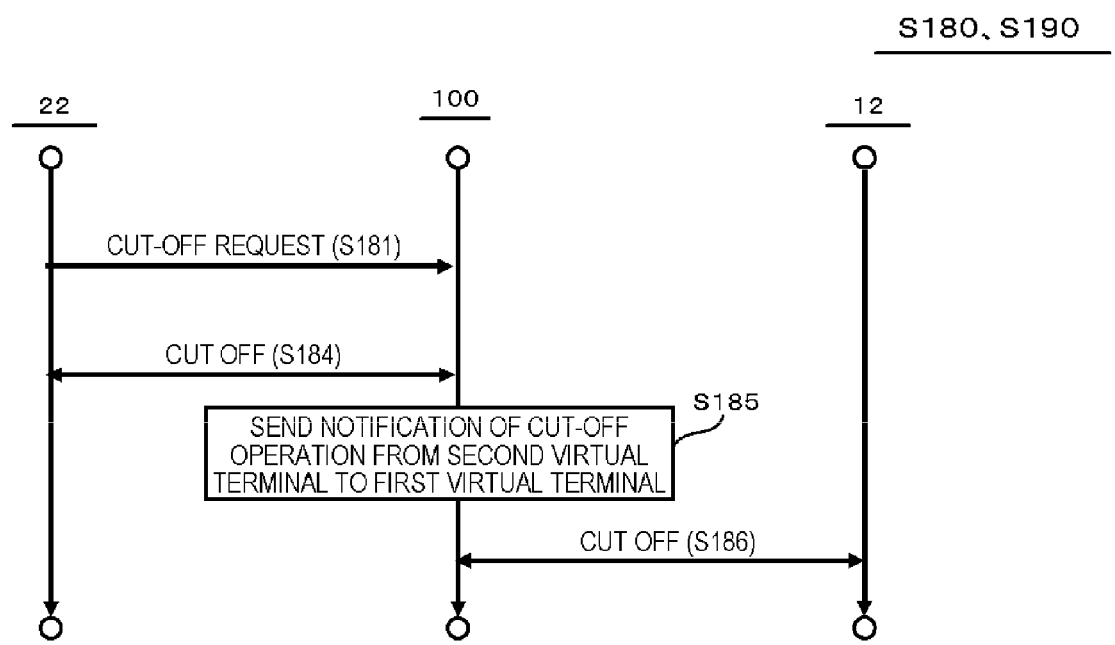
FIG. 7 is a flowchart illustrating a first specific example of steps S180 and S190 of FIG. 4.

FIG. 7 is a flowchart illustrating a first specific example of steps S180 and S190 of FIG. 4, that is, processing of cutting off the first virtual terminal 124 and the second virtual terminal 125. In the example shown in the drawing, a cut-off request as the second forwarding order information is sent from the second telephone terminal 22 to the second virtual terminal 125 through the telephone exchange unit 112 of the telephone relay device 100 and the external telephone relay device 200 shown in FIG. 1 (step S181). On receiving the cut-off request, the second virtual terminal 125 cuts off the telephone call with the second telephone terminal 22 (step S184). The second virtual terminal 125 also notifies the first virtual terminal 124 that the cut-off operation is performed (step S185). On receiving the cut-off notification, the first virtual terminal 124 performs processing of cutting off the telephone call between the first virtual terminal 124 and the first telephone terminal 12 (step S186).

Figure 8:
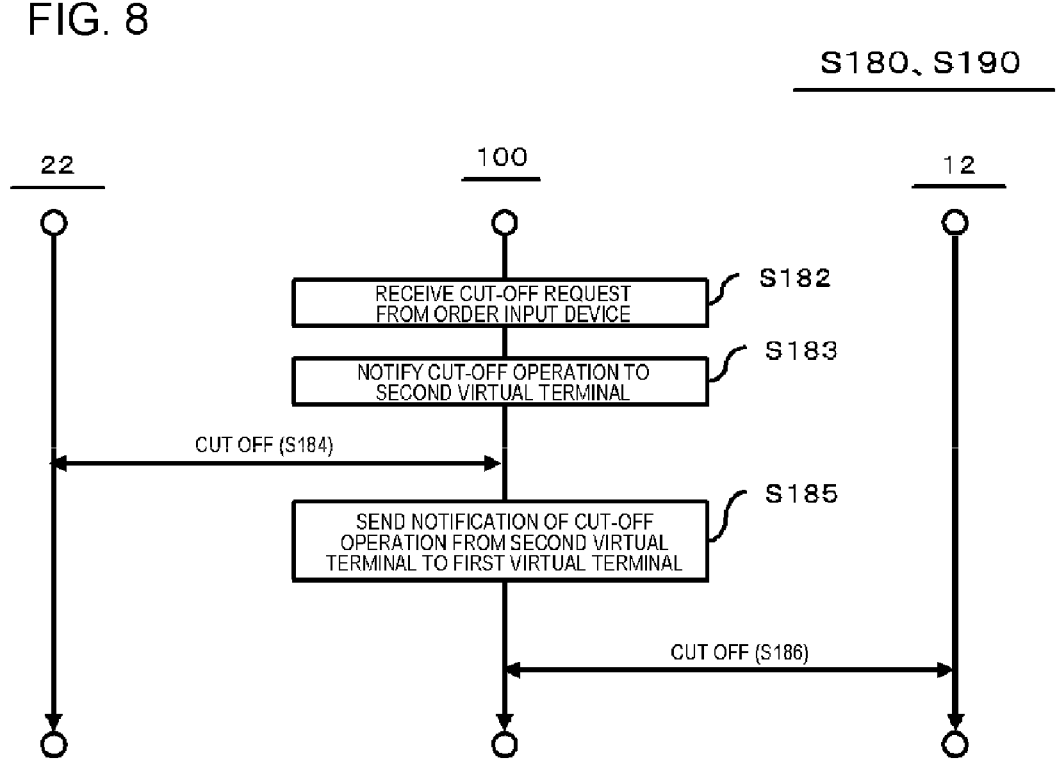
FIG. 8 is a flowchart illustrating a second specific example of steps S180 and S190 of FIG. 4.

FIG. 8 is a flowchart illustrating a second specific example of steps S180 and S190 of FIG. 4, that is, processing of cutting off the first virtual terminal 124 and the second virtual terminal 125. In the example shown in the drawing, the second forwarding order information is sent from the order input device 40 to the forwarding order reception unit 121 of the telephone relay device 100 (step S182). On receiving the second forwarding order information, the forwarding order reception unit 121 notifies the second virtual terminal 125 (step S183) of the reception. Then, the second virtual terminal 125 cuts off the telephone call with the second telephone terminal 22 (step S184). The following processing (steps S185 and S186) is the same as that of the example shown in FIG. 7.

Figure 9:
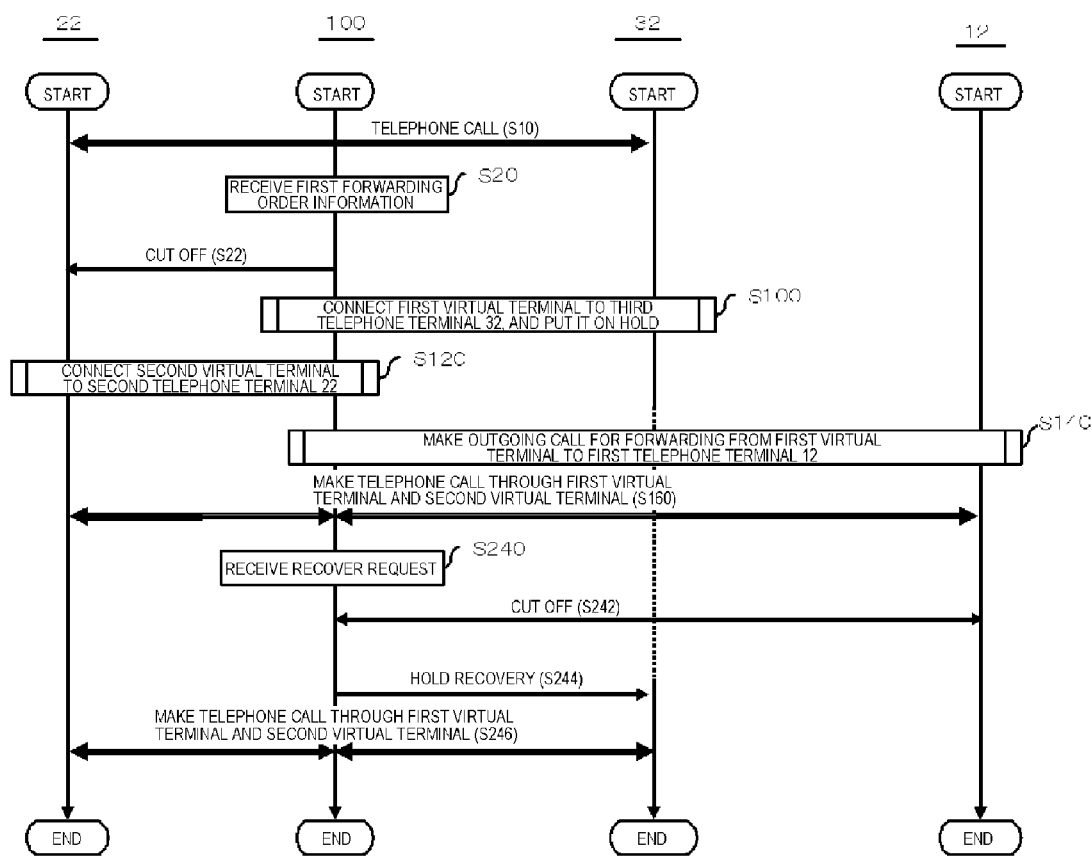
FIG. 9 is a flowchart illustrating a second example of the forwarding processing of the telephone relay device shown in FIG. 1.

FIG. 9 is a flowchart illustrating a second example of the forwarding processing of the telephone relay device 100 shown in FIG. 1. In the example shown in the drawing, after a telephone call between the first telephone terminal 12 and the second telephone terminal 22, the telephone relay device 100 does not connect the first telephone terminal 12 to the third telephone terminal 32, but connects the second telephone terminal 22 to the third telephone terminal 32 again.

The processing shown in the drawing, that is, the processing up to step S160 is the same as the processing shown in FIG. 4. In this state, the second telephone terminal 22 is connected to the first telephone terminal 12 through the second virtual terminal 125 and the first virtual terminal 124. The user of the second telephone terminal 22 inputs recovery request information to the order input device 40. The recovery request information indicates a request to recover the telephone call between the second telephone terminal 22 and the third telephone terminal 32. The order input device 40 transmits the recovery request information to the forwarding order reception unit 121 of the telephone relay device 100. The forwarding order reception unit 121 receives the recovery request information (step S240), and transmits the recovery request to the telephone exchange unit 112 through the first virtual terminal 124. The telephone exchange unit 112 cuts off the telephone call between the first virtual terminal 124 and the first telephone terminal 12 (step S242). Then, the telephone exchange unit 112 transmits the information indicating the recovery from on-hold status to the third telephone terminal 32 (step S244), and connects the first virtual terminal 124 to the third telephone terminal 32. Thus, the second telephone terminal 22 is connected to the third telephone terminal 32 again (step S246). In this state, the second telephone terminal 22 is connected to the third telephone terminal 32 through the second virtual terminal 125 and the first virtual terminal 124.

Figure 10:
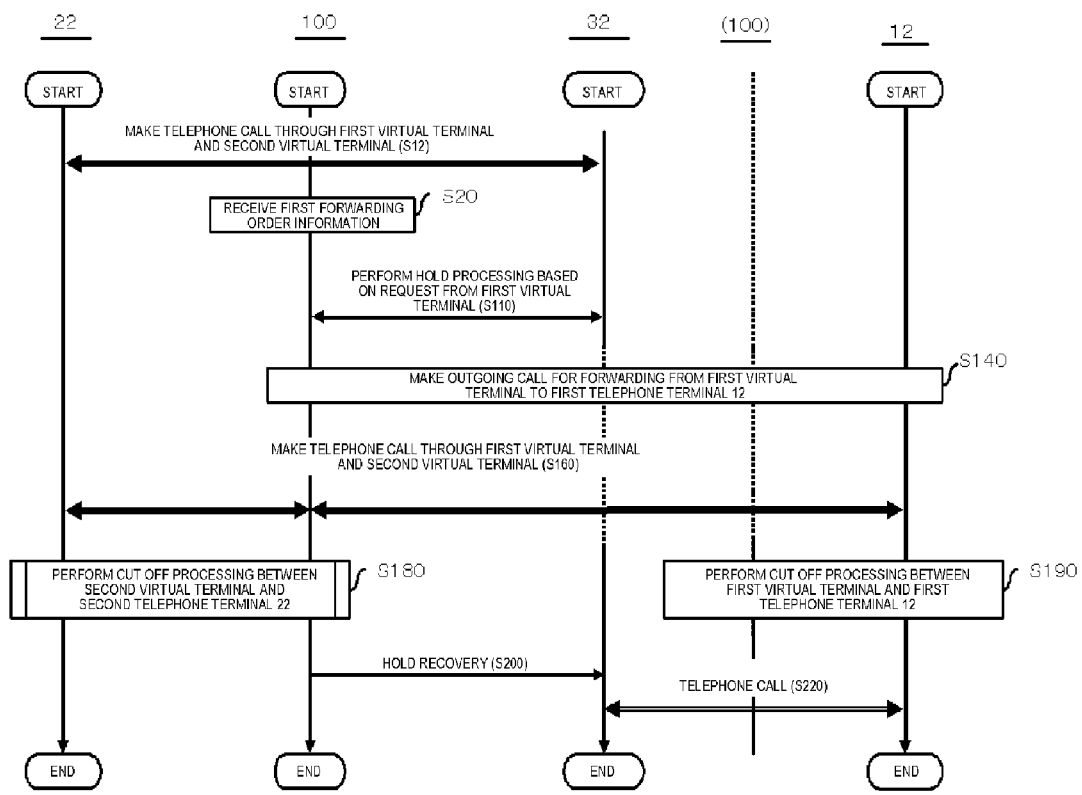
FIG. 10 is a flowchart illustrating a third example of the forwarding processing of the telephone relay device shown in FIG. 1.

FIG. 10 is a flowchart illustrating a third example of the forwarding processing of the telephone relay device 100 shown in FIG. 1. The processing shown in the drawing begins from the point where the second telephone terminal 22 and the third telephone terminal 32 are connected to each other through the second virtual terminal 125 and the first virtual terminal 124 (step S12). That is, the second telephone terminal 22 is connected to the second virtual terminal 125, and the third telephone terminal 32 is connected to the first virtual terminal 124. This state is, for example, the state of step S246 of FIG. 9. The second virtual terminal 125 of the telephone relay device 100 may make an outgoing call to the second telephone terminal 22, and the first virtual terminal 124 may make an outgoing call to the third telephone terminal 32 for the connection between the second telephone terminal 22 and the third telephone terminal 32 through the second virtual terminal 125 and the first virtual terminal 124. Further, the third telephone terminal 32 may make an outgoing call to the first virtual terminal 124, and then the second virtual terminal 125 may make an outgoing call to the second telephone terminal 22 for the connection between the second telephone terminal 22 and the third telephone terminal 32 through the second virtual terminal 125 and the first virtual terminal 124. Further, the third telephone terminal 32 may make an outgoing call to the first virtual terminal 124, and then the second telephone terminal 22 may make an outgoing call to the second virtual terminal 125 for the connection between the second telephone terminal 22 and the third telephone terminal 32 through the second virtual terminal 125 and the first virtual terminal 124.

The forwarding order reception unit 121 of the telephone relay device 100 receives the first forwarding order information sent from the order input device 40 (step S20). Then, the forwarding order reception unit 121 makes the first virtual terminal 124 hold the telephone call with the third telephone terminal 32 (step S110). Subsequently, the first virtual terminal 124 makes an outgoing call for forwarding to the first telephone terminal 12 (step S140). The following processing is the same as that of the example shown in FIG. 4.

Next, the effects and advantages of the present embodiment will be described. According to the present embodiment, the processing performed by the telephone relay device 100 alone enables forwarding of the telephone call between the second telephone terminal 22 and the third telephone terminal 32 to the first telephone terminal 12. For this reason, the second telephone terminal 22 is able to forward the telephone call between the second telephone terminal 22 and the third telephone terminal 32 to the first telephone terminal 12 without change of the configuration of the external telephone relay device 200 managing the second telephone terminal 22.

Further, after a telephone call takes place between the second telephone terminal 22 and the first telephone terminal 12, the first telephone terminal 12 and the third telephone terminal 32 are connected. Accordingly, only when the user of the first telephone terminal 12 wants, the third telephone terminal 32 can be connected to the first telephone terminal 12. Further, when the user of the first telephone terminal 12 does not want to connect the first telephone terminal 12 and the third telephone terminal 32, the second telephone terminal 22 can be connected to the third telephone terminal 32 again.

Second Embodiment

The telephone relay device according to the present embodiment checks whether or not a telephone call takes place between the second telephone terminal 22 and the third telephone terminal 32 through the first virtual terminal 124 and the second virtual terminal 125. After that, the telephone relay device performs processing of forwarding the telephone call between the second telephone terminal 22 and the third telephone terminal 32 from the second telephone terminal 22 to the first telephone terminal 12. In one case where a telephone call between the two terminals takes place through the first virtual terminal 124 and the second virtual terminal 125, the processing shown in FIG. 10 is performed. In another case where the telephone call takes place without through the first virtual terminal 124 and the second virtual terminal 125, the processing shown in FIG. 4 is performed. Hereinafter, the components common to those of the first embodiment will be represented by the same reference numerals and signs, and description thereof will not be repeated.

Figure 11:
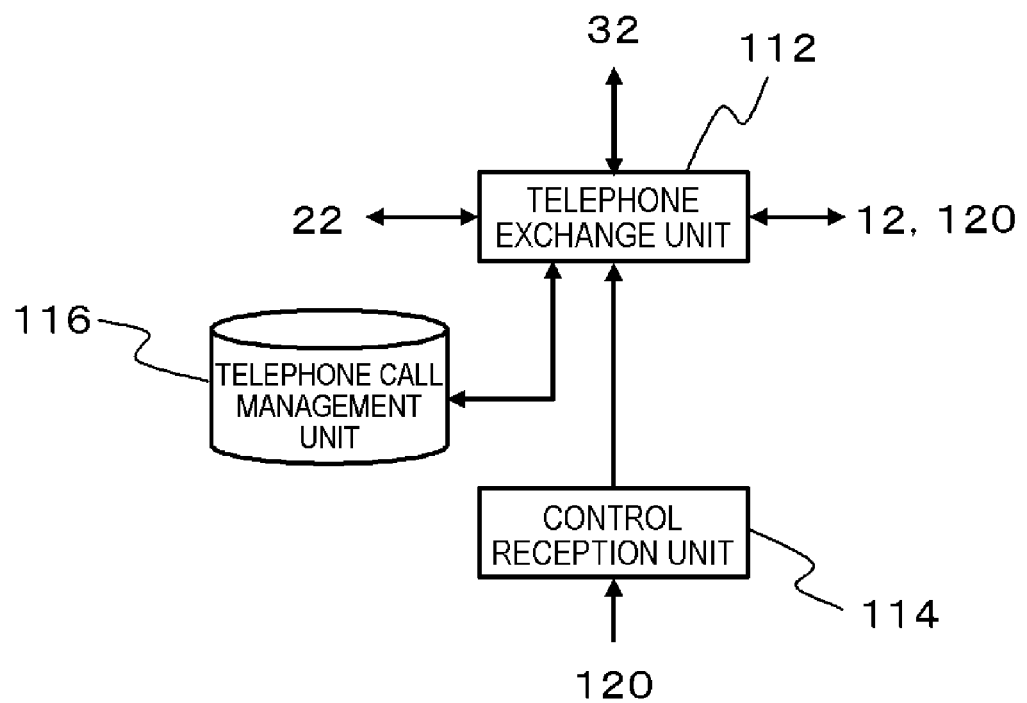
FIG. 11 is a block diagram illustrating a configuration of the first device of a telephone relay device according to a second embodiment.

FIG. 11 is a block diagram illustrating a configuration of the first device 110 of the telephone relay device 100 according to the present embodiment. The first device 110 according to the present embodiment has the same configuration as the first device 110 according to the first embodiment except that it has a telephone call management unit 116. The telephone call management unit 116 associates the telephone numbers of two telephone terminals with each other and stores them. These two telephone terminals are connected to each other by the telephone exchange unit 112.

Figure 12:
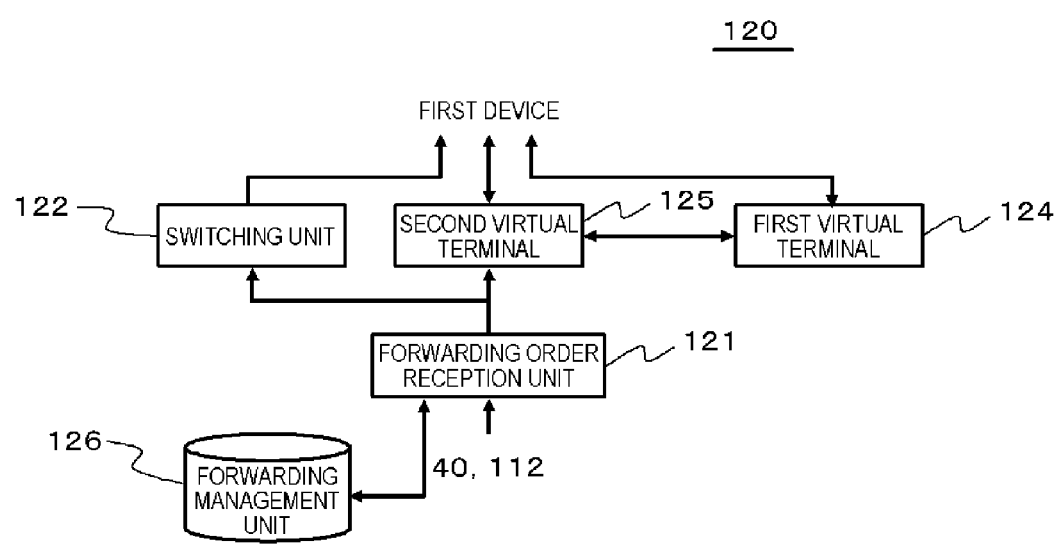
FIG. 12 is a block diagram illustrating a configuration of the second device of the telephone relay device according to the second embodiment.

FIG. 12 is a block diagram illustrating a configuration of the second device 120 of the telephone relay device 100 according to the present embodiment. The second device 120 according to the present embodiment has the same configuration as the first device 110 according to the first embodiment except that it has a forwarding management unit 126. The forwarding management unit 126 associates the telephone number (for example, the telephone number of the second telephone terminal 22) of the forwarding source and the telephone number (for example, the telephone number of the first telephone terminal 12) of the forwarding destination with each other, and stores them. The telephone number of the forwarding source and the telephone number of the forwarding destination are included in the first forwarding order information received by the forwarding order reception unit 121.

Figure 13:
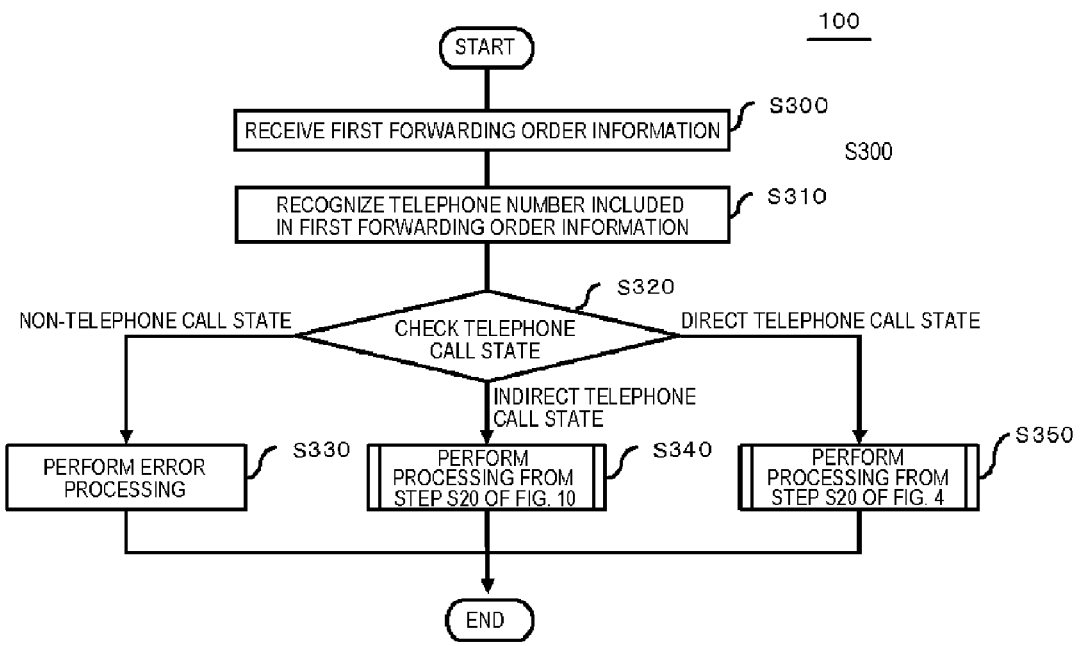
FIG. 13 is a flowchart illustrating processing performed by the telephone relay device according to the second embodiment.

FIG. 13 is a flowchart illustrating processing performed by the telephone relay device 100 according to the present embodiment. The forwarding order reception unit 121 of the telephone relay device 100 receives the first forwarding order information from the order input device 40 (step S300). The forwarding order reception unit 121 recognizes the telephone number of the second telephone terminal 22 included in the first forwarding order information (step S310), and checks a telephone call state on the basis of the telephone number (step S320).

In one case where the telephone number of the second telephone terminal 22 is stored in the forwarding management unit 126, the forwarding order reception unit 121 determines that a telephone call takes place between the second telephone terminal 22 and the third telephone terminal 32 through the first virtual terminal 124 and the second virtual terminal 125. In this case, processing from step S20 of FIG. 10 is performed (step S340).

In another case where the telephone number of the forwarding source is not stored in the forwarding management unit 126, the forwarding order reception unit 121 transmits the telephone number of the second telephone terminal 22 to the first device 110 through the switching unit 122. The forwarding order reception unit 121 checks whether or not the telephone number of the second telephone terminal 22 is stored in the telephone call management unit 116. In the case where the first device 110 determines that the telephone number of the second telephone terminal 22 is stored in the telephone call management unit 116, the forwarding order reception unit 121 determines that a telephone call between the second telephone terminal 22 and the third telephone terminal 32 takes place directly through the telephone exchange unit 112. In this case, processing from step S20 of FIG. 4 is performed (step S350).

In the case where the first device 110 determines that the telephone number of the second telephone terminal 22 is not stored in the telephone call management unit 116, the forwarding order reception unit 121 performs error processing (step S330). Furthermore, instead of the error processing, the second telephone terminal 22 and the first telephone terminal 12 may be connected to each other through the first virtual terminal 124 and the second virtual terminal 125 by an outgoing call from the first virtual terminal 124 to the second telephone terminal 22 and by an outgoing call from the second virtual terminal 125 to the first telephone terminal 12.

According to the present embodiment, it is also possible to obtain the same effects as the first embodiment.

Third Embodiment

The telephone relay device 100 according to the present embodiment is the same as the telephone relay device 100 according to the first embodiment except processing performed when the second telephone terminal 22 and the second virtual terminal 125 are connected to each other during the processing performed by the switching unit 122.

Figure 14:
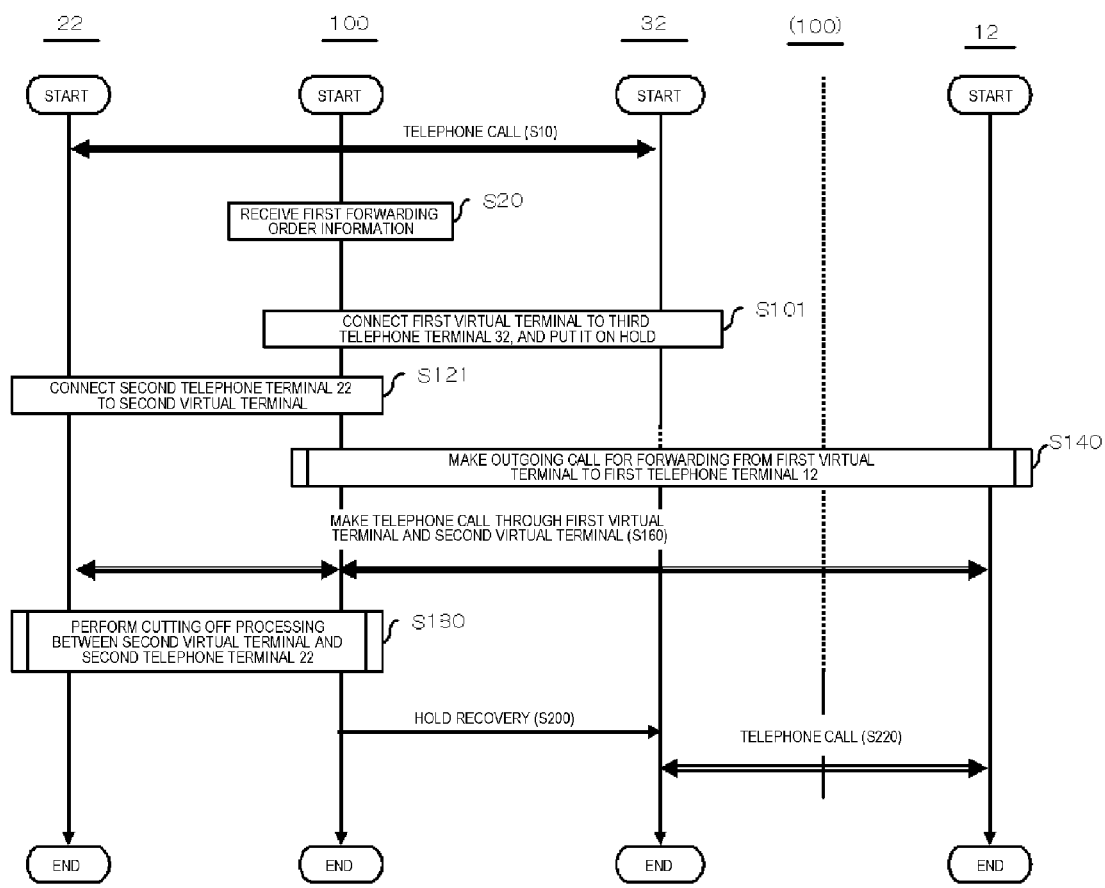
FIG. 14 is a flowchart illustrating an operation of a telephone relay device according to a third embodiment.

FIG. 14 is a flowchart illustrating operations of the telephone relay device 100 according to the present embodiment. The processing shown in the drawing is the same as that of the first embodiment up to step S20. The forwarding order reception unit 121 of the telephone relay device 100 receives the first forwarding order information sent from the order input device 40 (step S20). The switching unit 122 does not cut off the telephone call on the second telephone terminal 22. The switching unit 122 forwards the outgoing call from the third telephone terminal 32 to the first virtual terminal 124 by control of the telephone exchange unit 112. Thus, the switching unit 122 connects the first virtual terminal 124 to the third telephone terminal 32. Then, the switching unit 122 makes the first virtual terminal 124 transmit an outgoing call for hold (step S101).

Subsequently, the switching unit 122 switches the access point of the second telephone terminal 22 to the second virtual terminal 125 by control of the telephone exchange unit 112 (step S121). Specifically, the telephone exchange unit 112 notifies the second virtual terminal 125 of an incoming call from the second telephone terminal 22. The second virtual terminal 125 performs an incoming call response in response to the incoming call notification. Thus, it is possible to switch the access point of the second telephone terminal 22 to the second virtual terminal 125.

The following processing is the same as the first embodiment.

According to the present embodiment, it is also possible to obtain the same effects as the first embodiment. In addition, in step S350 of the second embodiment, the processing described in the present embodiment may be performed.

Fourth Embodiment

Figure 15:
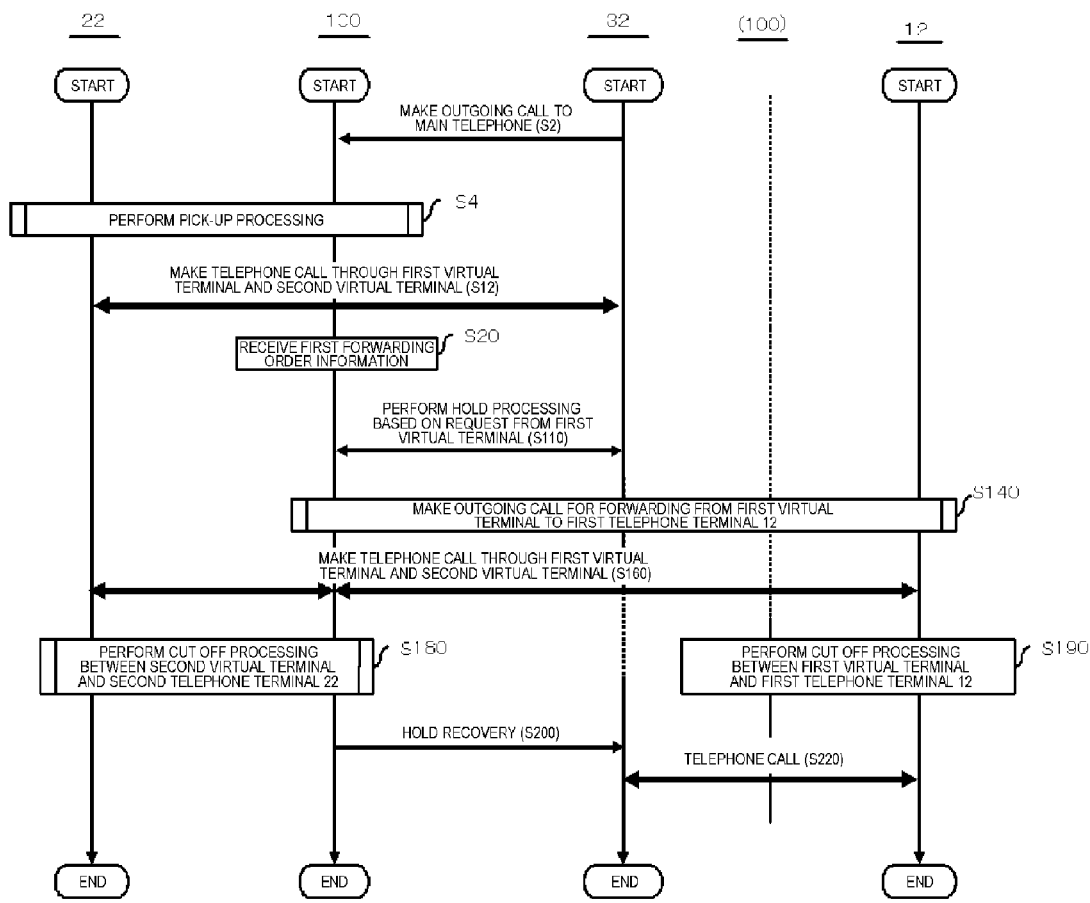
FIG. 15 is a flowchart illustrating processing performed by a telephone relay device according to a fourth embodiment.

FIG. 15 is a flowchart illustrating processing which is performed by a telephone relay device 100 according to a fourth embodiment. In the present embodiment, the third telephone terminal 32 makes a telephone call to a main telephone of the first telephone communication network 10 as an internal line communication network (step S2). The second telephone terminal 22 performs pick-up processing on the incoming telephone call made to the main telephone (step S4). Thus, the second telephone terminal 22 makes a telephone call to the third telephone terminal 32 through the second virtual terminal 125 and the first virtual terminal 124 (step S12). The following processing is the same as the processing from S20 of FIG. 10.

Figure 16:
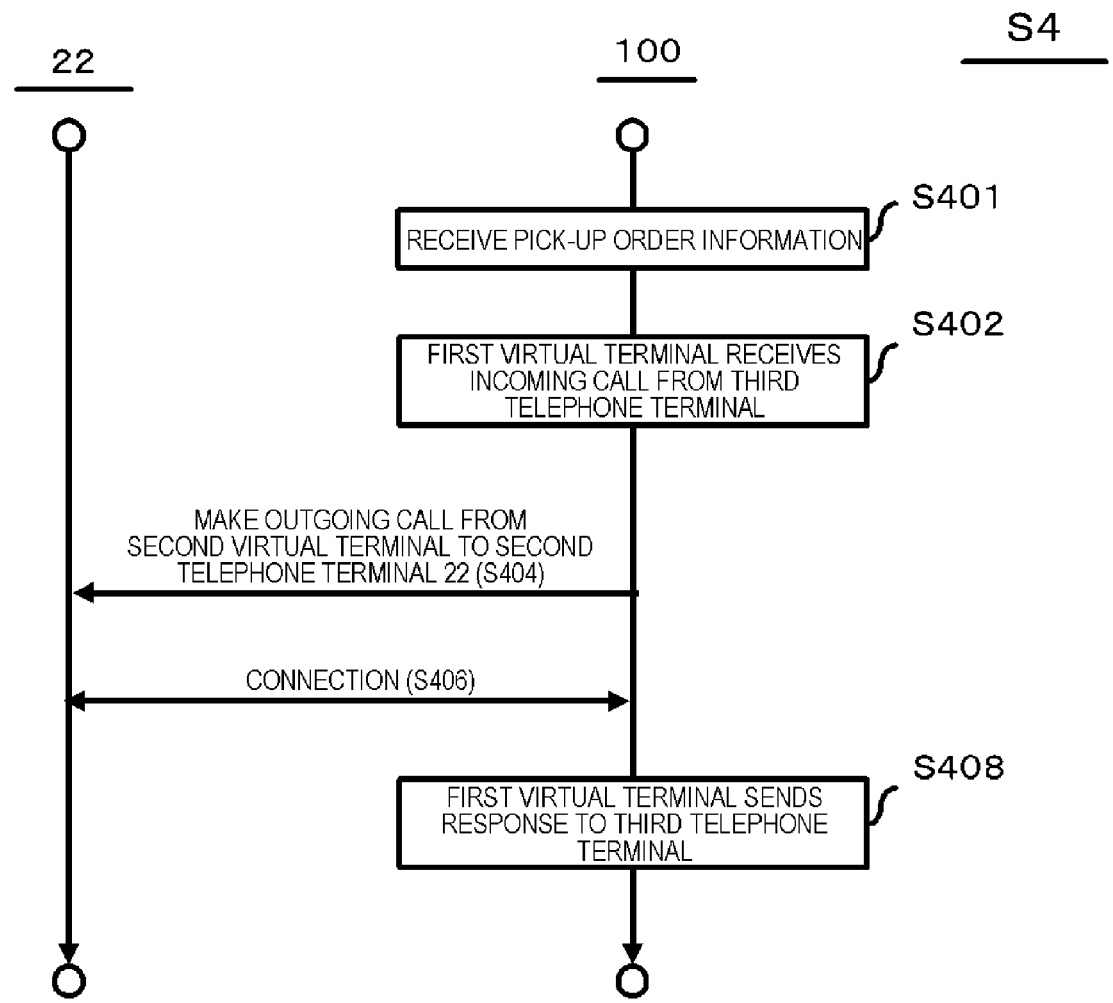
FIG. 16 is a flowchart illustrating a first example of step S4 of FIG. 15.

FIG. 16 is a flowchart illustrating a first example of the pick-up processing (step S4 of FIG. 15). The user of the second telephone terminal 22 inputs pick-up order information to the order input device 40. The pick-up order information indicates making the second telephone terminal 22 pick up the main telephone. The order input device 40 transmits the pick-up order information to the telephone relay device 100. The forwarding order reception unit 121 receives the pick-up order information sent from the order input device 40 (step S401). The pick-up order information includes the telephone number of the second telephone terminal 22.

Subsequently, the forwarding order reception unit 121 makes each processing unit of the second device 120 perform the following processing. First, the switching unit 122 makes the first virtual terminal 124 receive the incoming call from the third telephone terminal 32 (step S402) by control of the telephone exchange unit 112. In this state, the first virtual terminal 124 does not respond to the incoming call.

Then, the switching unit 122 notifies the second virtual terminal 125 of the telephone number of the second telephone terminal 22 included in the pick-up order information. The switching unit 122 makes the second virtual terminal 125 transmit an outgoing call to the second telephone terminal 22 (step S404). When the second telephone terminal 22 responds to the outgoing call, the second virtual terminal 125 and the second telephone terminal 22 are connected (step S406). After that, the first virtual terminal 124 and the second virtual terminal 125 are connected, and the first virtual terminal 124 is made to respond to the incoming call from the third telephone terminal 32 (step S408). Thus, the third telephone terminal 32 is connected to the second telephone terminal 22 through the first virtual terminal 124 and the second virtual terminal 125.

Figure 17:
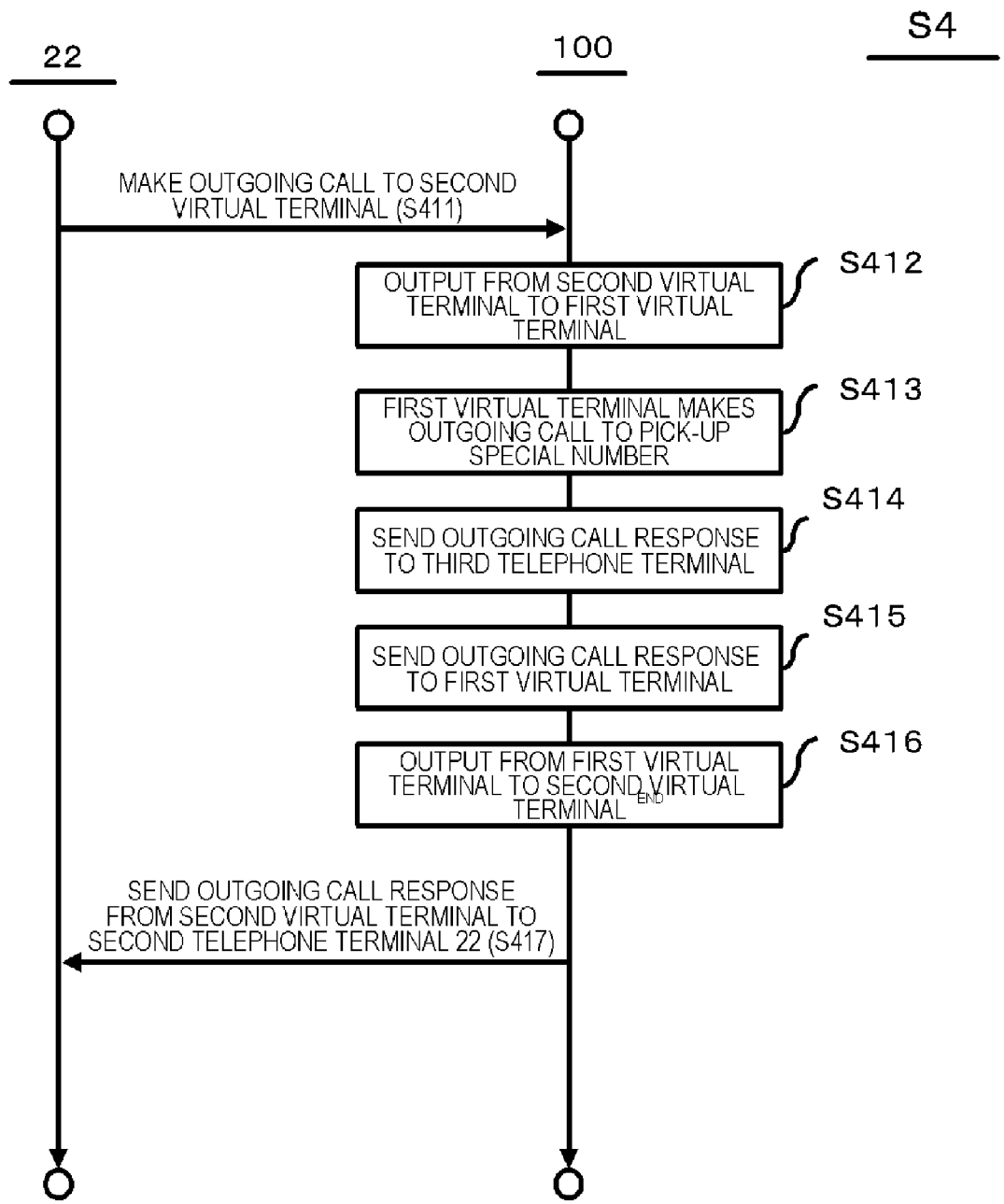
FIG. 17 is a flowchart illustrating a second example of step S4 of FIG. 15.

FIG. 17 is a flowchart illustrating a second example of the pick-up processing (step S4 of FIG. 15). The user of the second telephone terminal 22 makes the second telephone terminal 22 transmit an outgoing call whose called party number corresponds to the second virtual terminal 125 (step S411). On receiving the outgoing call from the second telephone terminal 22, the second virtual terminal 125 outputs information indicating presence of the outgoing call from the second telephone terminal 22, and this information is output to the first virtual terminal 124 (step S412). The first virtual terminal 124 perform outgoing call processing in which a pick-up special number as a telephone number for performing the pick-up processing is set as a called party number (step S413).

On receiving the outgoing call for the pick-up special number, the telephone exchange unit 112 of the telephone relay device 100 transmits the outgoing call response to the third telephone terminal 32 (step S414), and transmits the outgoing call response to the first virtual terminal 124 (step S415). The first virtual terminal 124 outputs information indicating reception of the outgoing call response, and this information is output to the second virtual terminal 125 (step S416). Then, second virtual terminal 125 transmits the response of the incoming call for the second telephone terminal 22 to the telephone exchange unit 112. Then, the telephone exchange unit 112 transmits the outgoing call response indicating presence of the response to the outgoing call in step S411, and this information is sent to the second telephone terminal 22 (step S417). Thus, the third telephone terminal 32 is connected to the second telephone terminal 22 through the first virtual terminal 124 and the second virtual terminal 125.

Figure 18:
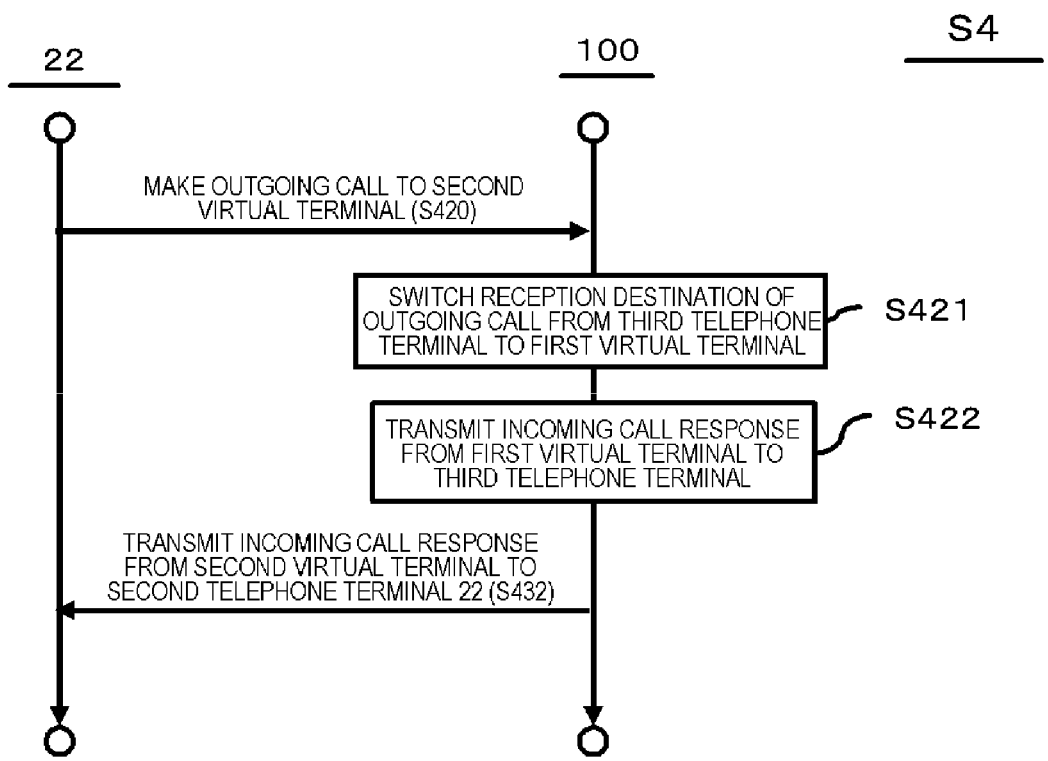
FIG. 18 is a flowchart illustrating a third example of step S4 of FIG. 15.

FIG. 18 is a flowchart illustrating a third example of the pick-up processing (step S4 of FIG. 15). The user of the second telephone terminal 22 makes the second telephone terminal 22 transmit an outgoing call whose called party number corresponds to the second virtual terminal 125 (step S420). The second virtual terminal 125 notifies the forwarding order reception unit 121 of the presence of the incoming call from the second telephone terminal 22. Through the switching unit 122, the forwarding order reception unit 121 makes the telephone exchange unit 112 switch the reception destination of the outgoing call sent from the third telephone terminal 32, from the main telephone number to the first virtual terminal 124 (step S421).

The first virtual terminal 124 transmits an incoming call response to the outgoing call sent from the third telephone terminal 32, and this response is sent to the telephone exchange unit 112. Then, the telephone exchange unit 112 transmits an outgoing call response to the third telephone terminal 32 (step S422).

Subsequently, the first virtual terminal 124 notifies the second virtual terminal 125 that the incoming call response is sent to the third telephone terminal 32. Then, the second virtual terminal 125 transmits the incoming call response to the telephone exchange unit 112. Then, the telephone exchange unit 112 transmits the outgoing call response to the second telephone terminal 22 (step S423). Thus, the third telephone terminal 32 is connected to the second telephone terminal 22 through the first virtual terminal 124 and the second virtual terminal 125.

According to the present embodiment, it is also possible to obtain the same effects as the first embodiment. Further, the telephone call made to the main telephone of the first telephone communication network 10 can be picked up by the second telephone terminal 22 connected to the second telephone communication network 20.

Fifth Embodiment

Figure 19:
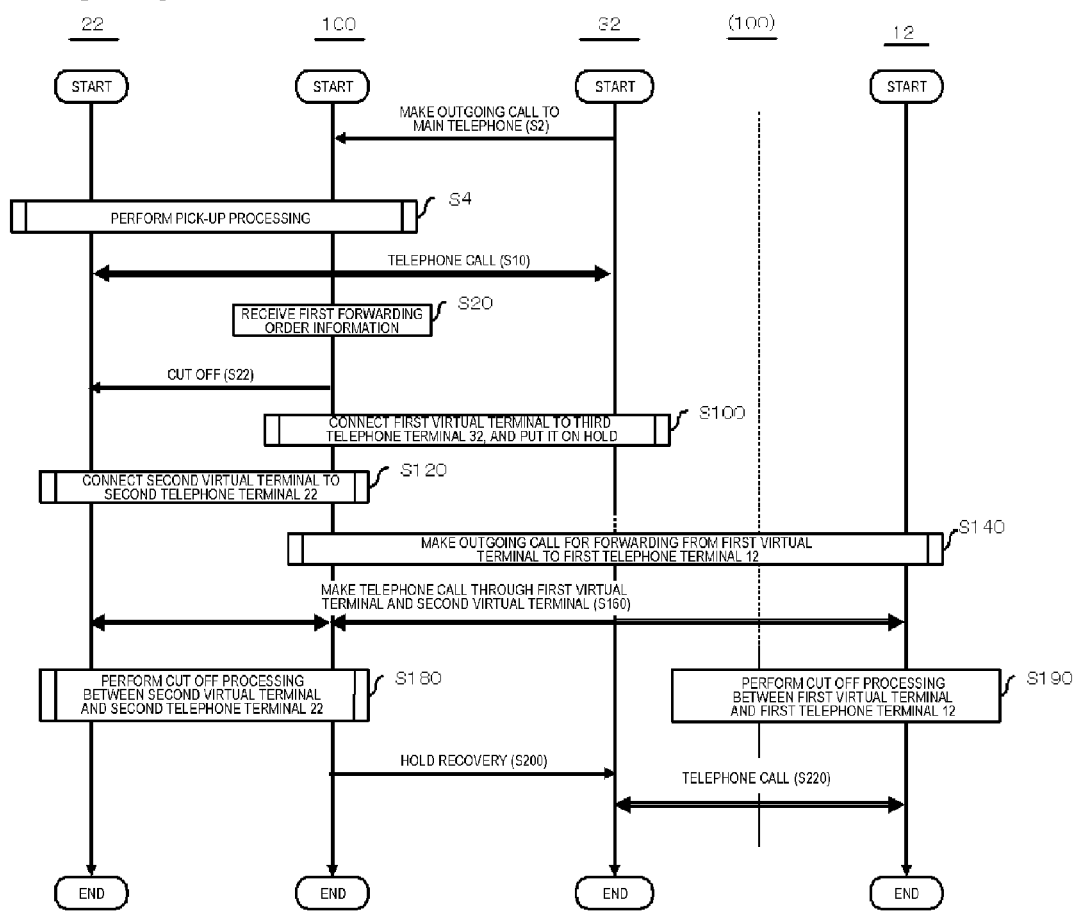
FIG. 19 is a flowchart illustrating processing performed by a telephone relay device according to a fifth embodiment.

FIG. 19 is a flowchart illustrating processing which is performed by a telephone relay device 100 according to a fifth embodiment. In the present embodiment, the third telephone terminal 32 makes a telephone call to a main telephone of the first telephone communication network 10 (step S2). The second telephone terminal 22 performs pick-up processing on the incoming telephone call made to the main telephone (step S4). Then, the second telephone terminal 22 makes a telephone call to the third telephone terminal 32 without through the second virtual terminal 125 and the first virtual terminal 124 (step S10). The following processing is the same as the processing shown in FIG. 4.

Figure 20:
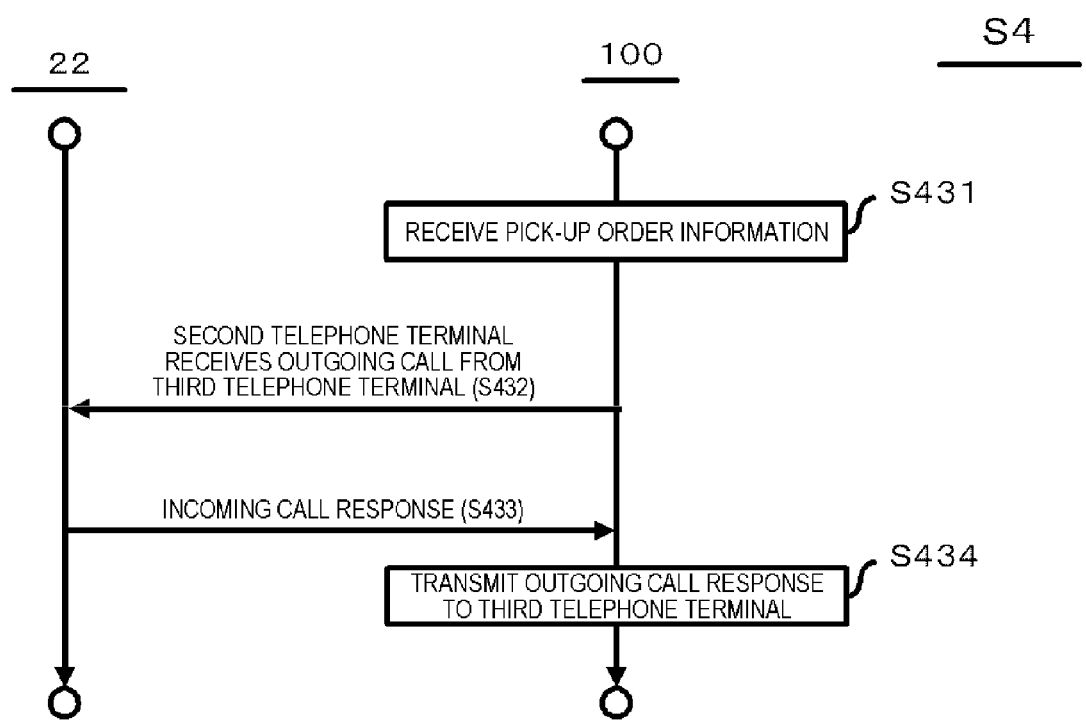
FIG. 20 is a flowchart illustrating a first example of step S4 of FIG. 19.

FIG. 20 is a flowchart illustrating a first example of the pick-up processing (step S4 of FIG. 19). The user of the second telephone terminal 22 inputs pick-up order information to the order input device 40. The pick-up order information indicates making the second telephone terminal 22 pick up the main telephone. The order input device 40 transmits the pick-up order information to the telephone relay device 100. The forwarding order reception unit 121 receives the pick-up order information sent from the order input device 40

(step S431). The pick-up order information includes the telephone number of the second telephone terminal 22.

Subsequently, the forwarding order reception unit 121 makes each processing unit of the second device 120 perform the following processing. First, the switching unit 122 switches the reception destination of the outgoing call from the third telephone terminal 32 to the second telephone terminal 22 (step S432) by control of the telephone exchange unit 112. The second telephone terminal transmits an incoming call response (step S433), and the telephone exchange unit 112 transmits an outgoing call response to the third telephone terminal 32 (step S434). Thus, the third telephone terminal 32 is connected to the second telephone terminal 22 through the telephone exchange unit 112.

Figure 21:
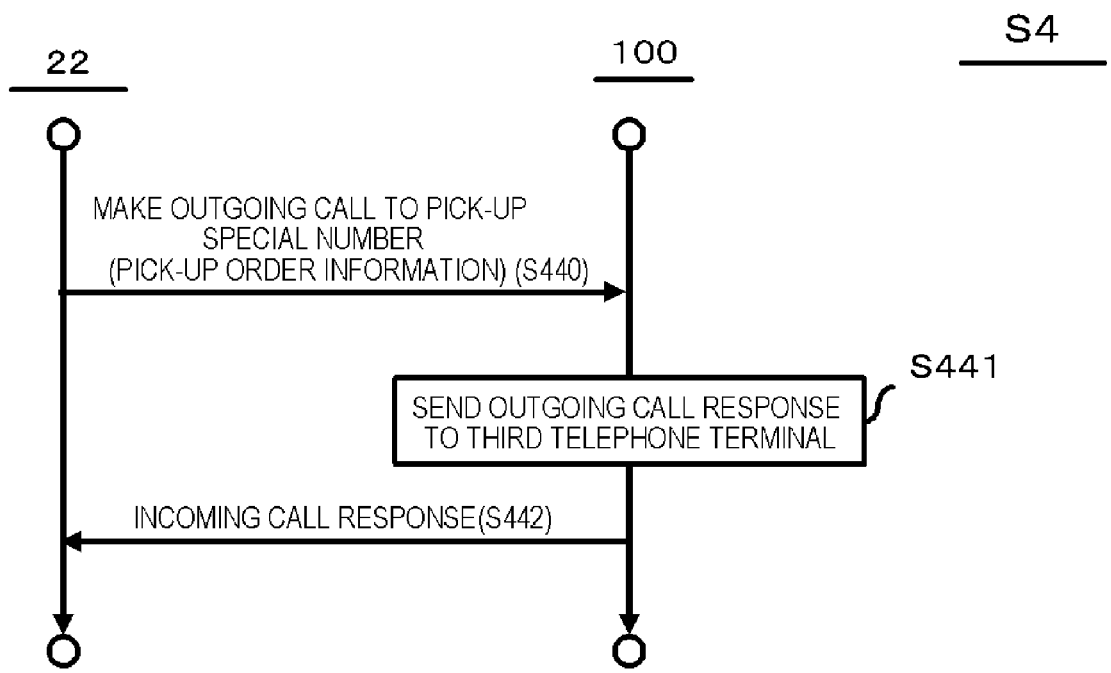
FIG. 21 is a flowchart illustrating a second example of step S4 of FIG. 19.

FIG. 21 is a flowchart illustrating a second example of the pick-up processing (step S4 of FIG. 19). The user of the second telephone terminal 22 makes the second telephone terminal 22 transmit an outgoing call to a pick-up special number as a telephone number for performing the pick-up operation (step S440). On receiving the outgoing call for the pick-up special number, the telephone exchange unit 112 of the telephone relay device 100 transmits the outgoing call response to the third telephone terminal 32 (step S441), and transmits the incoming call response to the second telephone terminal 22 (step S442). Then, the third telephone terminal 32 is connected to the second telephone terminal 22 through the telephone exchange unit 112.

According to the present embodiment, it is also possible to obtain the same effect as the fourth embodiment.

Referring to the drawings, the embodiments of the present invention have been hitherto described. However, those are examples of the present invention, and various configurations other than those may be adopted. For example, the orders of some parts of the processing may be changed with each other.

The present application claims the priority based on Japanese Patent Application No. 2009-228393 filed in the Japanese Patent Office on Sep. 30, 2009, the entire contents of which are incorporated herein by reference.

The invention claimed is:

1. A telephone relay device provided in a first telephone communication network and relaying a telephone call on a first telephone terminal connected to the first telephone communication network, the telephone relay device being used in conjunction with an external telephone relay device, the external telephone relay device being provided in a second telephone communication network and relaying a telephone call on a second telephone terminal connected to the second telephone communication network, the telephone relay device comprising:
   a first virtual terminal;
   a second virtual terminal;
   a telephone exchange unit relaying a telephone call between the second telephone terminal and a third telephone terminal through the external telephone relay device, the third telephone terminal being outside the first telephone communication network and the second telephone communication network;
   a forwarding order reception unit receiving first forwarding order information, the first forwarding order information being ordering forwarding of the telephone call between the second telephone terminal and the third telephone terminal from the second telephone terminal to the first telephone terminal;
   a switching unit switching an access point of the third telephone terminal to the first virtual terminal and switching an access point of the second telephone terminal to the second virtual terminal by control of the telephone exchange unit, when the forwarding order reception unit receives the first forwarding order information;
   a calling unit putting the first virtual terminal on hold after the first virtual terminal connects to the third telephone terminal, and then calling the first telephone terminal by forwarding outgoing from the first virtual terminal to the first telephone terminal; and
   a connection processing unit connecting the first telephone terminal to the second telephone terminal through the first telephone terminal and the second virtual terminal after response of the first telephone terminal, and then connecting the first telephone terminal to the third telephone terminal when receiving second forwarding order information, the second forwarding order information being ordering switch of the access point of the first telephone terminal from the second telephone terminal to the third telephone terminal.

2. The telephone relay device according to claim 1, further comprising:
   a first device including the telephone exchange unit; and
   a second device including the first virtual terminal, the forwarding order reception unit, the switching unit, the calling unit, and the calling unit.

3. The telephone relay device according to claim 1,
wherein the second telephone communication network is a mobile telephone communication network, and the first telephone communication network is a fixed telephone communication network.

4. The telephone relay device according to claim 3,
wherein the fixed telephone communication network is an internal line communication network.

5. The telephone relay device according to claim 1,
wherein the forwarding order reception unit communicates with an order input device, the order input device being a device distinct from the second telephone terminal and inputting the first forwarding order information, and
the forwarding order reception unit receives the first forwarding order information from the order input device.

6. The telephone relay device according to claim 1,
wherein the switching unit cuts off the telephone call on the second telephone terminal by control of the telephone exchange unit, and then switches the access point of the second telephone terminal to the second virtual terminal by outgoing from the second virtual terminal to the second telephone terminal.

7. The telephone relay device according to claim 1,
wherein the switching unit switches the access point of the second telephone terminal to the second virtual terminal by control of the telephone exchange unit.

8. A method of relaying telephone calls,
wherein a first virtual terminal and a second virtual terminal are provided in a telephone relay device, the telephone relay device being provided in a first telephone communication network and relaying a telephone call on a first telephone terminal connected to the first telephone communication network,
wherein the telephone relay device
   relays a telephone call between a second telephone terminal and a third telephone terminal through an external telephone relay device, the second telephone terminal being connecting to a second telephone communication network, the third telephone terminal being outside the first telephone communication network and the second telephone communication network, and the external telephone relay device being provided in the second telephone communication network, receives first forwarding order information, the first forwarding order information being ordering forwarding of the telephone call between the second telephone terminal and the third telephone terminal from the second telephone terminal to the first telephone terminal, switches an access point of the third telephone terminal to the first virtual terminal and switches an access point of the second telephone terminal to the second virtual terminal, when the first forwarding order information is received, puts the first virtual terminal on hold after connecting the first virtual terminal to the third telephone terminal, and then calls the first telephone terminal by forwarding outgoing from the first virtual terminal to the first telephone terminal, and connects the first telephone terminal to the second telephone terminal through the first telephone terminal and the second virtual terminal after response of the first telephone terminal, and then connects the first telephone terminal to the third telephone terminal when receiving second forwarding order information, the second forwarding order information being ordering of switch of the access point of the first telephone terminal from the second telephone terminal to the third telephone terminal.

9. A non-transitory computer readable media recording a program for causing a computer to function as a telephone relay device relaying a telephone call on a first telephone terminal connected to a first telephone communication network, the program for causing the computer to execute functions of:

building a first virtual terminal;

building a second virtual terminal;

relaying a telephone call between a second telephone terminal and a third telephone terminal through an external telephone relay device, the second telephone terminal being connecting to a second telephone communication network, the third telephone terminal being outside the first telephone communication network and the second telephone communication network, and the external telephone relay device being provided in the second telephone communication network;

receiving first forwarding order information, the first forwarding order information ordering forwarding of the telephone call between the second telephone terminal and the third telephone terminal from the second telephone terminal to the first telephone terminal;

switching an access point of the third telephone terminal to the first virtual terminal and switching an access point of the second telephone terminal to the second virtual terminal, when the first forwarding order information is received;

putting the first virtual terminal on hold after connecting the first virtual terminal to the third telephone terminal, and then calling the first telephone terminal by forwarding outgoing from the first virtual terminal to the first telephone terminal; and connecting the first telephone terminal to the second telephone terminal through the first telephone terminal and the second virtual terminal after response of the first telephone terminal, and then connecting the first telephone terminal to the third telephone terminal when receiving second forwarding order information, the second forwarding order information being ordering switch of the access point of the first telephone terminal from the second telephone terminal to the third telephone terminal.

\* \* \* \* \*

UNITED STATES PATENT AND TRADEMARK OFFICE
CERTIFICATE OF CORRECTION

PATENT NO. : 8,577,010 B2  
APPLICATION NO. : 13/499180  
DATED : November 5, 2013  
INVENTOR(S) : Akihisa Kurashima and Toru Kaji Page 1 of 1

It is certified that error appears in the above-identified patent and that said Letters Patent is hereby corrected as shown below:

In the Drawings:

Sheet 4 of drawings: delete "S140" and insert -- S140 --

Sheet 9 of drawings: delete "S140" and insert -- S140 --

In the Claims:

Column 16, Line 24: In Claim 2, after "switching unit," delete "the calling unit,"

Signed and Sealed this  
Twenty-second Day of July, 2014

Michelle K. Lee  
*Deputy Director of the United States Patent and Trademark Office*